US010906150B2

(12) United States Patent
Jansen et al.

(10) Patent No.: US 10,906,150 B2
(45) Date of Patent: Feb. 2, 2021

(54) MECHANICALLY PUMPED SYSTEM FOR DIRECT CONTROL OF TWO-PHASE ISOTHERMAL EVAPORATION

(71) Applicant: Rolls-Royce North American Technologies Inc., Indianapolis, IN (US)

(72) Inventors: Eugene Jansen, Stafford, VA (US); Eric Donovan, Fishers, IN (US)

(73) Assignee: ROLLS-ROYCE NORTH AMERICAN TECHNOLOGIES INC, Indianapolis, IN (US)

( * ) Notice: Subject to any disclaimer, the term of this patent is extended or adjusted under 35 U.S.C. 154(b) by 54 days.

(21) Appl. No.: 16/380,644

(22) Filed: Apr. 10, 2019

(65) Prior Publication Data

US 2019/0314945 A1    Oct. 17, 2019

Related U.S. Application Data (60) Provisional application No. 62/656,168, filed on Apr. 11, 2018.

(51) Int. Cl.
*B23Q 11/14* (2006.01)
(52) U.S. Cl.
CPC .................. *B23Q 11/141* (2013.01)
(58) Field of Classification Search
CPC combination set(s) only.
See application file for complete search history.

(56) References Cited

U.S. PATENT DOCUMENTS

| | | | |
|---|---|---|---|
| 3,091,944 A | 6/1963 | Van Den Berge et al. | |
| 4,143,705 A | 3/1979 | Awalt, Jr. | |
| 4,175,399 A | 11/1979 | Edwards et al. | |
| 4,333,316 A | 6/1982 | Stamp, Jr. et al. | |
| 4,482,008 A | 11/1984 | Nomaguchi et al. | |
| 4,742,868 A | 5/1988 | Mitani et al. | |
| 4,934,155 A * | 6/1990 | Lowes .................... | F25B 40/00 62/197 |

(Continued)

FOREIGN PATENT DOCUMENTS

DE    11 2016 003 519.5 T5    4/2018
DE    11 2016 005 644.3 T5    8/2018

(Continued)

OTHER PUBLICATIONS

European Patent Office Search Report for corresponding European Patent Application No. 19168354.9, dated Jul. 29, 2019, 10 pages.

(Continued)

*Primary Examiner* — Emmanuel E Duke
(74) *Attorney, Agent, or Firm* — Brinks Gilson & Lione (57) ABSTRACT

A thermal system may comprise a reservoir, a first fluid flowpath, and a second fluid flowpath. The first fluid flowpath may start at the reservoir and return to the reservoir. The first fluid flowpath may comprise, in a direction of the fluid flow, a first side of a sub-cooler, a liquid pump, a first side of a pre-heater, and a first side of an evaporator. The second fluid flowpath may start at the reservoir and return to the reservoir. The second fluid flowpath may comprise, in a direction of a fluid flow, a pressure regulator, a vapor compressor, a first side of a condenser, and an expansion value.

21 Claims, 4 Drawing Sheets

(56) References Cited

U.S. PATENT DOCUMENTS

| | | | |
|---|---|---|---|
| 5,165,250 | A | 11/1992 | Nagatomo et al. |
| 5,353,602 | A | 10/1994 | Pincus |
| 5,678,626 | A | 10/1997 | Gilles |
| 7,185,506 | B2 | 3/2007 | Aflekt et al. |
| 7,648,598 | B2 | 1/2010 | Lee et al. |
| 8,176,722 | B2 | 5/2012 | Blonn et al. |
| 9,212,834 | B2 | 12/2015 | Parsonnet et al. |
| 9,719,699 | B2 | 8/2017 | Tamura et al. |
| 10,520,231 | B2 | 12/2019 | Itou et al. |
| 10,723,203 | B2 | 7/2020 | Kato et al. |
| 2008/0000613 | A1 | 1/2008 | Harpole |
| 2009/0049857 | A1 | 2/2009 | Murakami et al. |
| 2009/0272128 | A1 | 11/2009 | Ali |
| 2011/0067427 | A1 | 3/2011 | Haller et al. |
| 2011/0146313 | A1 | 6/2011 | Finckh et al. |
| 2012/0111036 | A1 | 5/2012 | Campbell et al. |
| 2013/0074531 | A1 | 3/2013 | Parsonnet et al. |
| 2013/0104582 | A1 | 5/2013 | Sandkoetter et al. |
| 2013/0174589 | A1 | 7/2013 | Wightman |
| 2014/0230471 | A1 | 8/2014 | Bart |
| 2015/0114017 | A1 | 4/2015 | Hayashi et al. |
| 2015/0292775 | A1 | 10/2015 | Ma et al. |
| 2016/0178243 | A1 | 6/2016 | Derosier |
| 2016/0201931 | A1 | 7/2016 | Ma et al. |
| 2017/0292770 | A1 | 10/2017 | Fowler et al. |
| 2018/0266709 | A1 | 9/2018 | Tucker et al. |
| 2019/0032979 | A1 | 1/2019 | Kasamatsu et al. |
| 2019/0226735 | A1 | 7/2019 | Bissell et al. |

FOREIGN PATENT DOCUMENTS

| | | |
|---|---|---|
| JP | H06-51756 U | 7/1994 |
| JP | 2012-145296 A | 8/2012 |
| JP | 2016-161226 A | 9/2016 |
| WO | WO 2013/038245 A1 | 3/2013 |

OTHER PUBLICATIONS

Ashrae Online Handbook, Chapter 18. Absorption Equipment, dated Mar. 29, 2019, pp. 1-25, available at https:handbook.ashrae.org/Print.html?file=Handbooks/R18/IP/R18_Ch18/r18_ch18_ip.aspx#R18_Ch18_biblio1.

Tulapurkar, C. et al., "Phase Change Materials for Domestic Refrigerators to Improve Food Quality and Prolong Compressor Off Time", International Refrigeration and Air Conditioning Conference at Purdue University, School of Mechanical Engineering, Jul. 12-15, 2010, paper 1044, pp. 1-9.

Kumar, V. et al., "Energy Saving Using Phase Change Material in Refrigerating System", Conference Paper, Mar. 2016, pp. 1-8, available at https://www.researchgate.net/publication/311569637.

Advanced Cooling Technologies (ACT), "Phase Change Material heat Sinks for Cooling | PCM Heat Exchanger & Thermal Storage", 2019, pp. 1-13, available at https://www.1-act.com/resources/thermal-storage/.

Advanced Cooling Technologies (ACT), "Vapor Compression System with PCM HX for Cooling High Power Lasers", Jan. 30, 2019, pp. 1-4, available at https://www.1-act.com/case-studies/vapor-compression-sytem-with-phase-change-material-heat-exchanger-for-cooling-high-power-lasers-and-direct-energy-weapon/.

American Society of Heating, Refrigerating and Air-Conditioning Engineers, Inc., "2010 Ashrae Handbook, Refrigeration", Inch-Pound Edition, Chapter 4, Liquid Overfeed Systems, Atlanta, Georgia, 11pgs.

Tuo, H. and Hrnjak, P., "Flash Gas Bypass Method for Improving Performance of an A/C System With a Microchannel Evaporator", International Refrigeration and Air Conditioning Conference at Purdue University, Jul. 16-19, 2012, paper 1322, 11pgs.

Nakayama, N., et al., "Development of a Refrigerant Two-Phase Flow Distributor for a Room Air Conditioner", International Refrigeration and Air Conditioning Conference at Purdue University, Jul. 25-28, 2000, paper 497, 9pgs.

Equilibar, Precision Pressure Control, Service Conditions, "Back Pressure Regulator for Two-Phase Flow," Jan. 29, 2019, 4pgs. https://www.equilibar.com/back-pressure-regulators/severe-services/two-phase-flow/.

Equilibar, Precision Pressure Control, "Advanced Temperature Control Using Two-Phase Refrigerant Pressure Control", Jan. 29, 2019, 7pgs. https://www.equilibar.com/applications/two-phase-refrigerant-control/.

Park, C. and Sunada, E., "Vapor Compression Hybrid Two-Phase Loop Technology for Lunary Surface Applications", Advanced Cooling Technologies, Inc., Lancaster, PA, Jan. 29, 2019, 12pgs. https://www.1-act.com/vapor-compression-hybrid-two-phase-loop-technology-for-lunar-surface-applications/.

Milosevic, A.S., "Flash Gas Bypass Concept Utilizing Low Pressure Refrigerants", Thesis, Graduate College of the University of Illinois at Urbana-Champaign, 2010, 316pgs.

* cited by examiner

MECHANICALLY PUMPED SYSTEM FOR DIRECT CONTROL OF TWO-PHASE ISOTHERMAL EVAPORATION

CROSS RELATED APPLICATIONS

This application claims priority to U.S. Provisional Patent Application No. 62/656,168, filed Apr. 11, 2018, titled "Mechanically Pumped System for Direct Control of Two-Phase Isothermal Evaporation at a Specified Temperature". This application is also related to concurrently filed and co-pending U.S. patent application Ser. No. 16/380,665, titled "Method for Reducing Condenser Size and Power on a Heat Rejection System". This application is also related to concurrently filed U.S. patent application Ser. No. 16/380, 685, titled "Method for Reducing Condenser Size and Power on a Heat Rejection System". The entirety of each of these application is incorporated herein by reference.

BACKGROUND

Isothermal, or constant temperature, heat rejection from a heat load to a multi-channel evaporator is difficult to achieve. Standard methods have various short comings and are in need of improvement.

SUMMARY

According to some aspects of the present disclosure, a thermal system is provided. The thermal system may comprise a reservoir, a first fluid flowpath, and a second fluid flowpath. The first fluid flowpath may start at the reservoir and return to the reservoir. The first fluid flowpath may comprise, in a direction of the fluid flow, a first side of a sub-cooler, a liquid pump, a first side of a pre-heater, and a first side of an evaporator. The second fluid flowpath may start at the reservoir and return to the reservoir. The second fluid flowpath may comprise, in a direction of a fluid flow, a pressure regulator, a vapor compressor, a first side of a condenser, and an expansion valve.

According to some aspects of the present disclosure, a thermal system for maintaining the temperature of a primary heat load is provided. The thermal system may comprise a reservoir, a cooling loop, and a heat rejection loop. The cooling loop may originate from the reservoir and returning to the reservoir. The cooling loop may comprise a primary heat exchanger, a liquid pump, a sub-cooler, a pre-heater, and a pressure regulator. The primary heat exchanger may have a cooling fluid outlet in fluid communication with the reservoir. The liquid pump may have a suction in fluid communication with the reservoir and a discharge in fluid communication with a cooling fluid inlet to the primary heat exchanger. The pre-heater may be between the discharge of the pump and the cooling fluid inlet to the primary heat exchanger. The pressure regulator may be between the primary heat exchanger and the reservoir. The heat rejection loop may originate from the reservoir and returning the reservoir. The heat rejection loop may comprise a condenser, a vapor compressor, a pressure regulator, and an expansion valve. The condenser may have a hot fluid outlet in fluid communication with the reservoir. The vapor compressor may have a suction in fluid communication with the reservoir and a discharge in fluid communication with a hot fluid inlet of the condenser. The pressure regulator may be between the reservoir and the suction of the vapor compressor. The expansion valve may be between a fluid outlet of the condenser and the reservoir.

According to some aspects of the present disclosure, a method of maintaining the temperature of a primary heat load is provided. The method may include drawing fluid from a reservoir; sub-cooling the fluid drawn from the reservoir; pumping the sub-cooled fluid to an inlet of an evaporator; pre-heating the pumped fluid prior to the inlet of the evaporator to a predetermined margin of sub-cooling; evaporating a portion of the fluid in the evaporator; regulating the pressure of the fluid at the outlet of the evaporator to thereby maintain a substantially constant fluid temperature between the inlet and the outlet of the channels of evaporator; and, returning the partially evaporated fluid to the reservoir. The method may further comprise, simultaneously with the above actions, drawing fluid from the reservoir; regulating the pressure of the fluid drawn from the reservoir; compressing the fluid drawn from the reservoir; condensing the compressed fluid; expanding the condensed fluid; and, returning the expanded fluid to the reservoir.

BRIEF DESCRIPTION OF THE DRAWINGS

The following will be apparent from elements of the figures, which are provided for illustrative purposes.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Some types of equipment produce large heat loads and require stable, consistent temperatures for best performance. Maintaining these loads at a consistent temperature while rejecting heat under isothermal conditions can be difficult. Current standard industry methods have been found to have either poor isothermality and low evaporator performance or require excessive space and additional equipment to provide the right conditions for optimal performance.

For example, direct expansion systems often use two-phase distributors to attempt to distribute the liquid-vapor mixture equally amongst parallel channels. Distribution of the fluid mixture has been found to be unsatisfactory because distribution amongst a large number numbers of channels (as in micro-channel evaporators) becomes unwieldy. The poor distribution capability of two-phase distributors results in channels with excess liquid and channels with too little liquid. The channels with less liquid will not sufficiently cool and the channels with more liquid may over-cool. This poor distribution results in unequal cooling that hampers isothermal heat rejection and/or evaporator performance.

Another type of heat transfer system is the flash gas bypass system. Flash gas bypass systems have been attempted to be used and investigated for their ability to distribute saturated liquid at the inlets of system evaporators. Flash gas bypass systems are a slight variation of direct-expansion systems in which the expanded refrigerant is separated into liquid and vapor after the system expansion device. The vapor is routed from the flash gas tank directly to the compressor inlet, thereby avoiding the pressure drop and the poor distribution experienced with two-phase mixtures at evaporator inlets. The liquid is routed from the flash gas tank to the evaporator inlet. However, the liquid in the flash gas tank is at or close to saturation conditions. It has been found that any pressure drop between the flash gas tank liquid outlet, an inlet to an evaporator, and to each channel of that evaporator can to cause the formation of vapor, thereby leading to poor two-phase distribution as described above, sub-optimal evaporator performance and less-than-ideal isothermality, if any.

Yet another example is the two-phase pumped loop. A two-phase pumped loop uses a pump to circulate liquid to the evaporator(s) and a liquid/vapor mix to the condenser(s). The entire system exists near a common saturation pressure. During higher heat loads, these systems generally require substantial liquid head at the inlet to each pump to avoid cavitation at pump impellers, which has been found to generate vapor and cause premature failure of pumps because the system is at or near saturation pressure. Also, controlling the liquid conditions at the pump inlet of two-phase pumped loops can be difficult. Over sub-cooling of the fluid is common during low heat loads. Excessive sub-cool at evaporator inlets has been found to produce varying temperatures and non-optimal evaporator performance. Two-phase pumped loops also require a separate, closed vapor compression loop to reject heat to higher temperature. The heat exchanger interface between the two-phase pumped loop and vapor compression loop can be excessively complex to maintain liquid condensate without excessive sub-cool.

Yet another example is the liquid overfeed system. Liquid overfeed systems utilize liquid pumps for distribution of flow to evaporators in conjunction with a vapor compression system in the same loop. Excessive sub-cool is less likely than in a two-phase pumped loop system, but the same cavitation concerns exist with system pump inlets as those experienced by two-phase pumped loops. Preventing this cavitation typically requires several feet of liquid above pump inlets and generously sized pump inlet pipe/tube.

Additionally, many systems return the effluent of the evaporator to the suction of a compressor. To prevent damage to the compressor from attempting to compress a liquid, these systems typically superheat the refrigerant to ensure that no liquid leaves the evaporator. Superheating has been found to require substantial heat transfer area, degrade evaporator performance, and hamper efforts to achieve isothermal heat rejection.

Figure 1A:
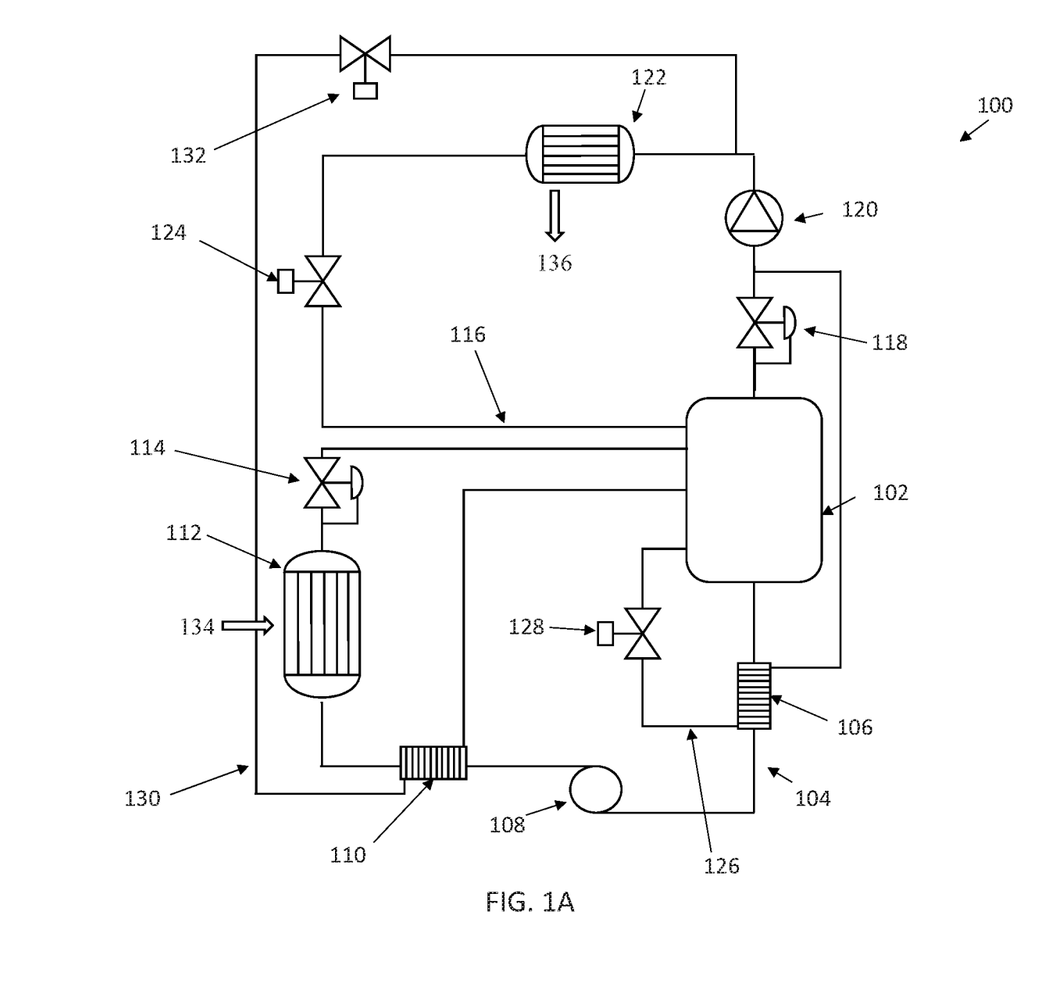
FIGS. 1A and 1B are diagrams of a thermal system in accordance with some embodiments.

In accordance with some embodiments, a thermal system 100 is illustrated in FIG. 1A. The thermal system 100 may comprise a reservoir 102, a first fluid flowpath 104 (also known as a cooling loop), a second fluid flowpath 116 (also known as a heat-rejection loop), a sub-cooling fluid flowpath 126, and a pre-heating fluid flowpath 130. Each of the above flowpaths may have a fluid disposed therein. The fluid may be water or refrigerant.

Reservoir 102 may perform many functions in system 100, including, providing a surge volume of fluid to first fluid flowpath 104, providing pump head to pump 108, and separating two-phase mixtures of the fluid into vapor and liquid.

First fluid flowpath 104 begins at an outlet from reservoir 102 and ends at an inlet to the reservoir. After exiting the reservoir 102 outlet, fluid flows to the warm-side/channels of sub-cooler 106. Fluid flowing through sub-cooler 106 transfers heat to fluid flowing in the cold-side/channels of sub-cooler 106, thereby reducing the temperature of the fluid within the first fluid flowpath 104.

In some embodiments, sub-cooler 106 may be any device capable of cooling the fluid in flowpath 104.

The fluid next flows to pump 108, a liquid pump that raises the pressure of the fluid and provides workflow to move the fluid within first fluid flowpath 104. The amount of pump head required from reservoir 102 can be reduced and/or eliminated by the sub-cooling of the fluid in sub-cooler 106. In some embodiments, the amount of sub-cooling of the fluid in the first fluid path in sub-cooler 106 is an amount necessary to prevent cavitation and/or vapor lock in pump 108.

After pump 108, the fluid flows to the cold-side/channels of pre-heater 110. The fluid in the cold-side/channels of pre-heater 110 is warmed by the fluid in the warm-side/channels of pre-heater 110, raising the temperature of the fluid in the first fluid flowpath 104 in the direction of saturation temperature. Pre-heater 110 may increase the temperature of the fluid flowing in the first fluid flowpath to a set point temperature that may have a determined amount of sub-cooling, as explained below.

In some embodiments, pre-heater 110 may any device capable of heating the fluid in flowpath 104.

Next, the fluid in the first fluid flowpath 104 flows through the cold-side/channels of evaporator 112. In evaporator 112, heat 134 is transferred into fluid in the cold-side channels. This heat transfer cools the heat load, which may be an isothermal heat load. As heat is transferred into the fluid, the heat vaporizes a portion of the fluid.

Evaporator 112 (which may be referred to as a primary heat exchanger) may have an inlet, an orifice/distribution plate, a plurality of channels, and an outlet. Fluid may be received at the inlet of evaporator 112 at a slightly subcooled condition. As the fluid flows over the orifice/distribution plate, the pressure of the fluid may drop to a saturation state for the enthalpy of the fluid. Fluid is thereby more evenly distributed to each of the channels because the fluid is slightly subcooled between the evaporator 112 inlet and the orifice/distribution plate. Any vapor that may form in the fluid prior to the evaporator channels happens right before the channels, minimizing and/or eliminating the cause of uneven distribution of the fluid. Maintaining the fluid at saturation conditions through the even mass of flow in each channel of evaporator 112 ensures that the fluid is at a constant temperature from inlet to outlet of the channels and helps maintain the required heat transfer in 134 at its required temperature.

In some embodiments, the fluid at the inlet to the evaporator may be subcooled by a measurable amount. The particular amount of sub-cooling is dependent on the evaporator design, and in particular, the inlet and orifice distribution plate design. The sub-cooling should be measurable and controllable such that the required saturation conditions can be maintained in the evaporator channels. In some embodiments, the fluid may be subcooled by a predetermined amount such that the pressure drop of the fluid across the orifice/distribution plate places the fluid at saturation conditions for the temperature of the previously subcooled fluid.

At the outlet of evaporator 112, a pressure regulator 114 may be disposed in the first fluid flowpath 104. Pressure regulator 114 maintains the pressure in the evaporator 112 such that the saturation temperature for the maintained pressure is the correct temperature to provide isothermal cooling to the heat load. Pressure regulator 114 may be a fixed spring, variable spring, or a diaphragm pressure regulator.

In some embodiments, first fluid flowpath may not comprise pressure regulator 114. In such embodiments, the fluid in the evaporator 112 may be maintained at a particular saturation temperature by setting the saturation pressure in cold-side/channels of evaporator 112 using pressure regulator 118. Pressure regulator 118 is described in more detail below.

Various parameters, e.g., temperature, pressure, flow rates, etc., of the fluid in the first fluid flowpath 104 may be monitored and adjusted to ensure isothermal heat rejection occurs. While maintaining the fluid in the evaporator 112 at saturation conditions fixes the temperature of the fluid, excessive vapor generation will inhibit the rate of heat input into the fluid in the cold-side/channels of the evaporator 112 because vapor is less capable of transferring heat when compared to liquid. Consequently, the temperature of the heat load may increase until the heat transfer rate reaches a new steady state value. To prevent these consequences, the vapor quality of the fluid in the evaporator is maintained below threshold levels to prevent this problem and perform other functions. For example, in some embodiments, the vapor quality of the bulk fluid at the evaporator outlet is no more than 85%. In some embodiments, the vapor quality of the fluid in any cold-side/channel of evaporator 112 is between 85 and 90% when the surface(s) of the cold-side channels utilize surface enhancements that substantially prevent the occurrence of dry-out in the channel. In some embodiments, the vapor quality of the fluid in any cold-side channel of evaporator 112 is between 65 and 85%. In some embodiments, the vapor quality of the bulk fluid the vapor quality of the bulk fluid at the evaporator outlet is less than 50%. In some embodiments, the vapor quality of the fluid in any cold-side/channel of evaporator 112 is less than 50%.

Finally, the first fluid flowpath terminates at an inlet to reservoir 102. Vapor formed in the first fluid flowpath fluid is separated from the liquid fluid and is drawn into the second fluid flowpath 116. The liquid returns to the reservoir 102 for subsequent reuse in the first fluid flowpath 104.

In some embodiments, a portion of the fluid may be diverted from the first fluid flowpath 104 to provide cooling fluid to other heat loads, e.g., hotel loads, that may or may not require isothermal heat rejection. For example, a diversion point downstream of pump 108 may provide this cooling fluid to another heat load. Another point of diversion may be upstream of pump 108. Another location includes downstream of evaporator 112 and upstream of pressure regulator 114, particularly when the vapor quality of the fluid at the outlet of the evaporator is at no more than 50%. Another location is downstream of pressure regulator 114 and upstream of the return to reservoir 102. Each of these additional lines may return to either the reservoir 102 or the suction of compressor 120 (described below). In some embodiments, these additional heat loads may be disposed at any of the above described diversion-point locations such that the cooling fluid in flowpath 104 flows from one component to the additional head load (formerly a diversion point) to another component in series within fluid in flowpath 104.

For embodiments in which an additional line returns to the reservoir 102, a pressure regulator may be disposed in the additional line to maintain the pressure of reservoir 102. For embodiments in which an additional line returns to the suction of compressor 120, a control valve may be utilized to ensure that the fluid in the additional line is superheated such that compressor 120 does not attempt to compress a liquid. These flow control valves may be applied to any optional cooling or heating line attached to system 100, even those not originating from first fluid flowpath 104. In embodiments providing additional cooling lines originating from first fluid flowpath 104, these cooling lines may comprise devices, e.g., an expansion valve, to further reduce the temperature of the fluid flowing therein and/or regulate flow. In some embodiments, a pressure regulator may be disposed downstream of the additional heat load and the reservoir 102 and suction of compressor 120 to which the additional line returns. The pressure regulator may be used to control the conditions (e.g., saturation conditions) of the cooling fluid.

In some embodiments, the amount of sub-cooling of the fluid in the first fluid flowpath 104 at the pump 108 suction may be greater than the amount of sub-cooling of the fluid in the first fluid flowpath 104 at the inlet of evaporator 112.

Second fluid flowpath 116 of system 100 may start at and end at reservoir 102. From reservoir 102, the fluid in the second fluid flowpath 116 flows to pressure regulator 118. Pressure regulator 118 is a backpressure regulator, and may be any type of suitable pressure regulator such as those described above for pressure regulator 114. Pressure regulator 118 maintains reservoir 102 at set pressure to keep the pump 108 inlet pressure stable to avoid cavitation and/or vapor lock.

From pressure regulator 118, fluid may flow to compressor 120. Compressor 120 compresses the fluid in the second fluid flowpath 116. This compression both raises the pressure of the fluid/vapor and raises its temperature.

After compressor 120, the compressed vapor may flow to condenser 122. Condenser 122 allows the compressed, elevated temperature vapor to reject heat as output 136, first received in system 100 in evaporator 112 and from the heat of compression, to an ambient environment or other system that may be at a temperature higher than the load that provides the heat 134 input. The fluid in the second fluid flowpath 116 may flow in the warm-side/channels of condenser 122. As heat is rejected heat, all or a portion of the fluid may be condensed in condenser 122. In some embodiments, the fluid is further sub-cooled in condenser 122.

The condensed fluid exiting condenser 122 flows to expansion valve 124. Expansion valve 124 drops the pressure of the fluid in the second fluid flowpath 116. A portion of the fluid will vaporize across expansion valve 124, reducing the temperature of the fluid mixture. The fluid mixture is then provided to an input of reservoir 102. The liquid and vapor in the mixture are separated, with the vapor returning to the suction of compressor 120, and the liquid being retained in reservoir 102 to be provided to pump 108.

Sub-cooling flowpath 126 may start at reservoir 102 and end when it joins the second fluid flowpath 116 at the suction of compressor 120. In some embodiments, sub-cooling flowpath may start as a branch off of the first fluid flowpath 104 located between the reservoir 102 and sub-cooler 106. Fluid in the sub-cooling flow path 126 flows through flow controller 128 to the cold-side/channels of sub-cooler 106. Flow controller 128 may regulate the flow of the fluid in the sub-cooling fluid flowpath 126. Flow controller 128 may also reduce the pressure of the fluid in the sub-cooling fluid flowpath 126 by expanding the fluid.

In sub cooler 106, heat from the fluid in the first fluid flowpath 104 may be transferred into the fluid in the sub-cooling fluid flowpath 126 as described above, imparting a margin of sub-cooling (or, the difference in temperature between the fluid and its saturation temperature). The amount of sub-cooling may be controlled by flow controller 128, which may be a flow control valve. The valve may be dynamically operated to vary the amount of sub-cooling of the fluid in the first fluid flowpath 104.

After sub-cooler 106, the fluid in the sub-cooling fluid flowpath 126 may flow to the suction of compressor 120, joining the second fluid flowpath at a location downstream of pressure regulator 118. At this location, the sub-cooling fluid flowpath 126 terminates.

Like the first fluid flowpath 104, additional cooling lines may divert a portion of the fluid in the sub-cooling fluid flowpath 126 to additional heat loads. These additional cooling lines may have the features as described above for the additional cooling lines associated with the first fluid flowpath 104. In some embodiments, addition heat loads may be disposed in sub-cooling fluid flowpath 126 in series with sub-cooler 106.

Pre-heating fluid flowpath 130 may branch off of the second fluid flowpath 116 downstream of the compressor 120 and upstream of condenser 122. Fluid at this point is at or near the highest temperature occurring within system 100. Fluid flows in the pre-heating fluid flowpath 130 from its originating point, through flow controller 132, the hot-side/ channels of pre-heater 110, and ends in the reservoir 102.

In pre-heater 110, heat from the fluid in pre-heating fluid flowpath 130 is transferred into the fluid in first fluid flowpath 104. This heat transfer reduces the margin of sub-cooling of the fluid in first fluid flowpath 104 from the amount of sub-cooling of the fluid exiting pump 108. The amount of sub-cooling may be controlled to achieve the desired amount of sub-cooling of the fluid in first fluid flowpath 104 at the evaporator 112 inlet as described above. Ideally, a near-zero or zero amount of sub-cooling occurs at the evaporator 112 inlet such that a pure liquid is distributed among the evaporator 112 channels.

The amount of heat transferred into the fluid in first fluid flowpath 104 may be controlled by flow controller 132. Flow controller 132 may be a flow control valve that is capable of dynamic operation to change the flow rate of the fluid flowing in the pre-heater fluid flowpath 130. Flow controller 132 may be an electric device such as an electronic thermal expansion valve and a liquid flow control valve or a mechanical device such as a blub-activated thermostatic expansion valve. In some embodiments, a pressure regulating valve is disposed in pre-heating fluid flowpath 130 downstream of pre-heater 110 and upstream of reservoir 102 to maintain the saturation pressure and corresponding saturation temperature elevated to transfer heat into the primary fluid in fluid flowpath 104 in preheater 110.

Figure 1B:
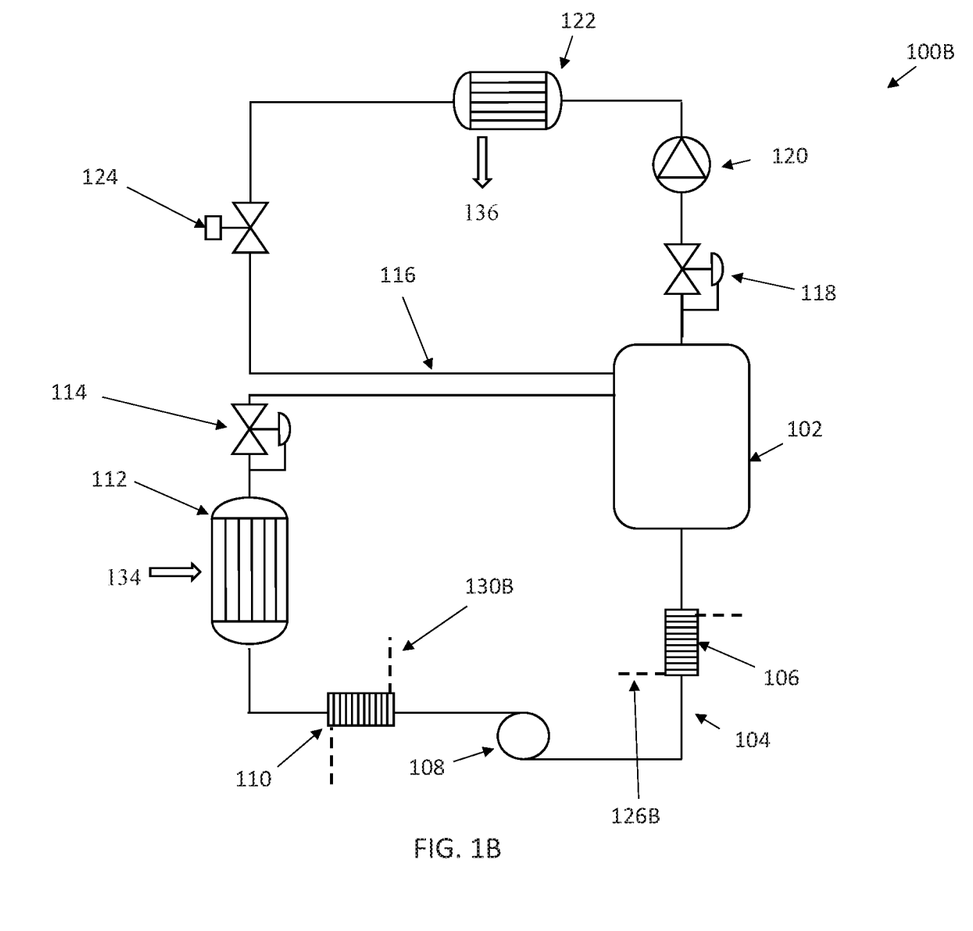

In some embodiments, the saturation pressure of the fluid in pre-heating fluid flowpath 130B may be determined at a location upstream of pre-heater 110 and regulated by flow controller 132 such that the required amount of heat is transferred into the primary fluid in first fluid flowpath 104.

While system 100 was described above as a liquid overfeed system having a vapor compression loop, it should be recognized that the principles described herein are equally applicable to other direct expansion and absorptions systems.

In accordance with some embodiments, a heat transfer system 100B is illustrated in FIG. 1B. As can be seen, heat transfer system 100B is comprised of many of the same components, each performing the same function as describe elsewhere herein, described with respect to FIG. 1A. However, system 100B differs from system 100 in that at least pre-heating fluid flowpath 130 has been removed and replaced by pre-heating fluid flowpath 130B, and sub-cooling fluid flowpath 126 has been removed and replaced by sub-cooling fluid flowpath 126B. Flowpath 130B and 126B each perform the same function as flowpath 130 and 126, respectively, however, each flowpath forms part of one or more separate heat transfer systems (not shown) configured to reject heat into or remove it from the fluid disposed in first fluid flowpath 104. Using a separate heat transfer system(s) allows for the use of different heat transfer fluids (e.g., water, refrigerant) between heat transfer systems that do not mix with one another.

Figure 2:
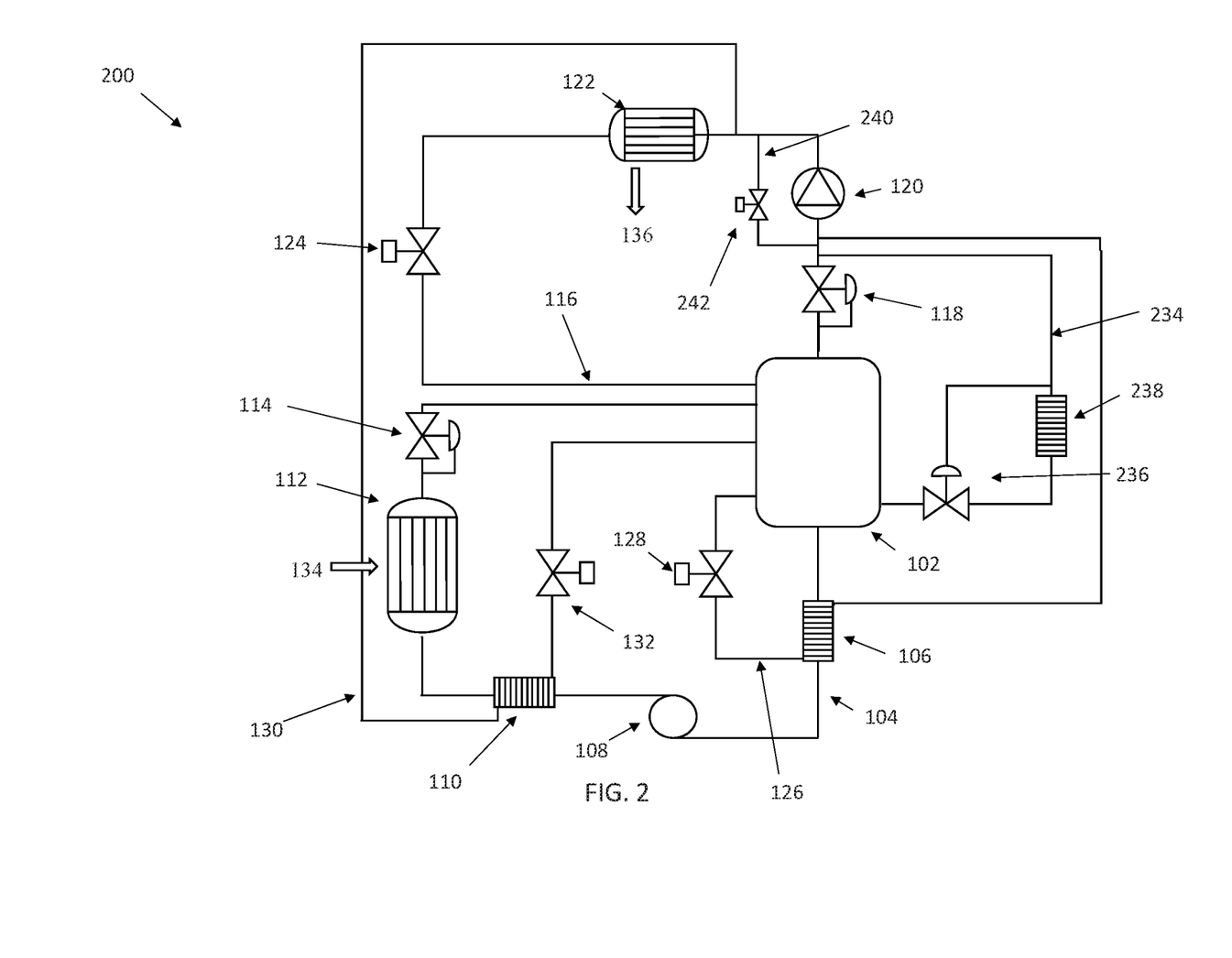
FIG. 2 is diagram of a thermal system in accordance with some embodiments.

In accordance with some embodiments, a heat transfer system 200 is illustrated in FIG. 2. As shown, system 200 comprises many of the same components as those described above for system 100. These same components may perform the same functions as described above. However, there are a few differences between system 100 and system 200. For example, flow controller 132 has been moved from the outlet of compressor 120 to a location downstream of pre-heater 110 and upstream of reservoir 102 in the pre-heating fluid flowpath 130. In some embodiments, flow controller 132 may be a pressure regulating valve. A pressure regulating valve may be used to control the conditions (e.g., saturation conditions) of the fluid flowing in pre-heating fluid flowpath 130 side of pre-heater 110. This control may be used to regulate the rate of heat transfer into the primary fluid in the first fluid flowpath 104. In some embodiments, a pressure regulator may be used downstream of pre-heater 110 and a flow control valve upstream of pre-heater 110 on the pre-heating fluid flowpath.

Another difference is the addition of the dedicated cooling fluid flowpath 234. Cooling fluid flow path 234 provides a direct means to draw fluid from reservoir 102 to provide for cooling to other loads, e.g., hotel loads. Cooling fluid flowpath 234 originates at reservoir 102, passes through control valve 236 and heat exchanger 238 before being joining the second fluid flowpath 116 at upstream of the suction of compressor 120 and downstream of pressure regulator 118. Control valve 236 may sense the fluid conditions (e.g., temperature, pressure, or both) downstream of heat exchanger 238 to ensure that excessive superheating of the fluid within cooling fluid flowpath 234 does not occur. In some embodiments, control valve 236 may be a flow control valve. In some embodiments, a pressure regulating valve (not shown) may be placed downstream of heat exchanger 238 and upstream of compressor 120 to control the conditions (e.g., saturation conditions) of cooling fluid flowpath 234 side channels of heat exchanger 238.

Yet another difference is the additional flow control valve 242, which provides a hot-gas bypass flowpath 240 from the outlet of compressor 120 back to the inlet of compressor 120. As can been seen in FIG. 2, the hot-gas bypass flowpath 240 provided by flow control valve 242 returns the vapor to a location upstream of the condenser 122.

In some embodiments, liquid injection is utilized to overcome excessive superheat in the primary fluid. Excessive superheat may occur, e.g., when a portion of the primary fluid is directed from the outlet of compressor 120 to the inlet of compressor 120 via flow control valve 242 and gas bypass flowpath 240. This excessive superheat may be overcome by supplying liquid to the inlet of the compressor 120. In some embodiments, the liquid may be supplied through the cooling fluid flowpath 234. Control valve 236 may be configured to increase the amount of liquid flowing from reservoir 102 through heat exchanger 238 to ensure a sufficient amount of liquid is available to overcome the excessive sub-cooling. In some embodiments, a dedicated liquid injection flowpath (not shown) may be provided between the reservoir 102 and the inlet of compressor 120. This liquid injection flowpath may utilize a flow control valve upstream of the compressor 120 inlet to control the flow of liquid.

Figure 3:
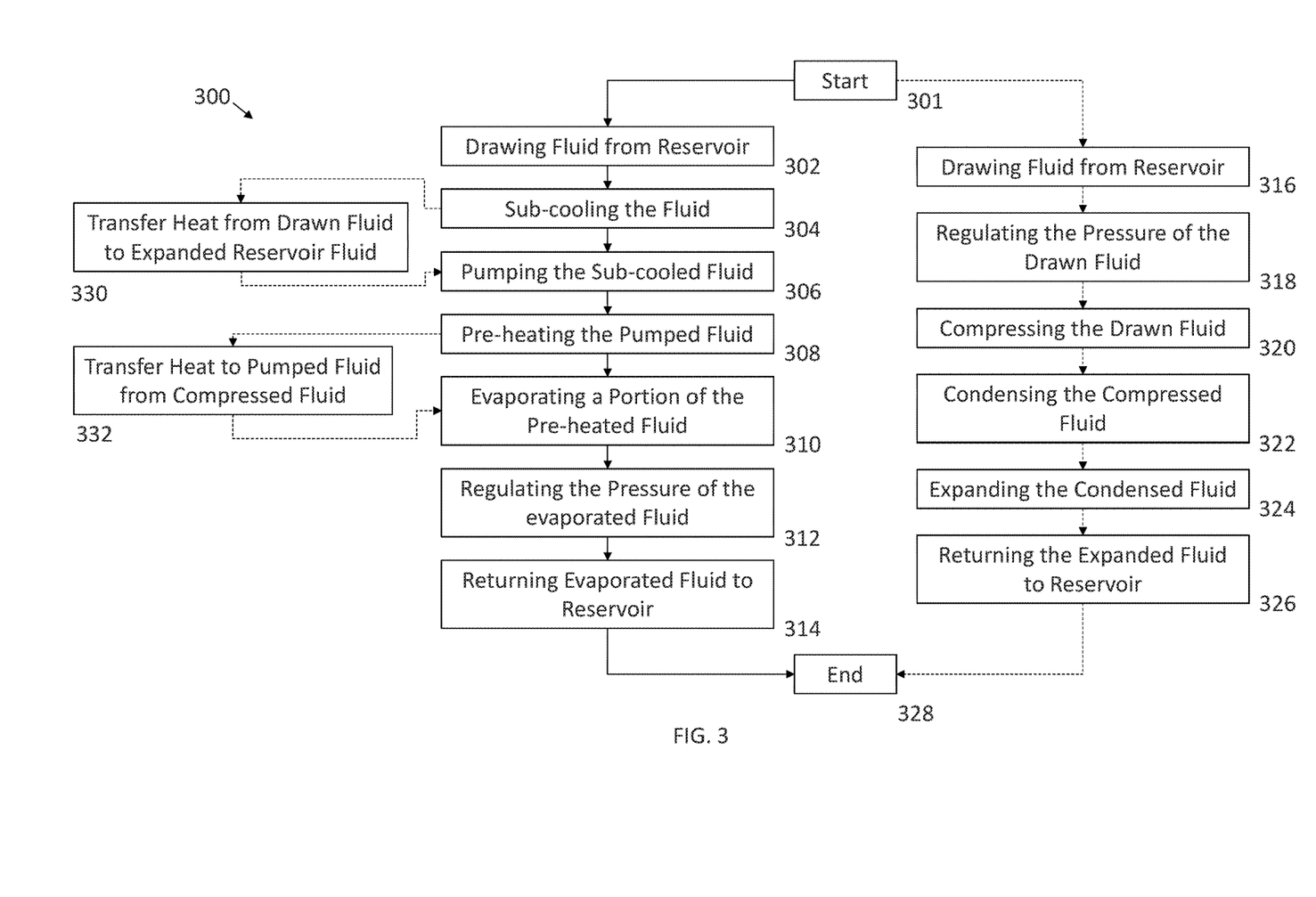
FIG. 3 is a method of maintaining the temperature of a heat load in accordance with some embodiments.

In accordance with some embodiments, a method 300 of maintaining the temperature of a heat load is provided in FIG. 3. Method 300 starts at block 301. At block 302 a fluid, which may be a liquid, is drawn from a reservoir. At block 304, the fluid is sub-cooled. The sub-cooled fluid is then pumped to the inlet of an evaporator at block 306. The pumped fluid is pre-heated at block 308 prior to the inlet of an evaporator. The fluid may be pre-heated to a determined margin of sub-cooling as described above. At block 310, at least a portion of the fluid is evaporated in the evaporator. In some embodiments, the vapor quality of the evaporated fluid is limited/maintained as described above. At block 312, the pressure of the fluid in the evaporator is regulated by a pressure regulator located at the outlet of the channels of the evaporator. This regulation maintains a substantially constant fluid temperature between the inlet and the outlet of the evaporator. As used herein, maintaining the fluid at a substantially constant temperature refers to the bulk temperature of the fluid as a whole and not to any particular minor deviation of a portion of the fluid in the evaporator from that bulk temperature. At block 314, the fluid is returned to the reservoir.

In some embodiments, the above actions are performed simultaneous as those actions described below in blocks 316 to 326. At block 316, a fluid, which may be a vapor, is drawn from the reservoir. The pressure of the fluid is regulated by a pressure regulator in block 318. At block 320, the drawn fluid is compressed, thereby raising its temperature and pressure. The compressed fluid is then condensed at block 322. The condensed fluid is expanded, thereby reducing its temperature and pressure at block 324. At block 326, the expanded fluid, which may be a liquid/vapor mixture, is returned to the reservoir. The method ends at block 328.

In some embodiments, the sub-cooling of the fluid at block 304 may be performed by transferring heat from the fluid into an expanded fluid that is drawn from the reservoir at block 330. In some embodiments, the pre-heating of the fluid at block 308 may be performed by transferring heat from a compressed fluid, e.g., the compressed fluid at block 320, to the pumped fluid at block 332.

It should be understood that various portions of method 300 may be performed on one or both of the heat transfer systems 100 and 200 described herein. It should be further understood that method 300 may comprise additional steps to perform the capabilities of the systems 100 and 200 as described above, such as providing additional cooling to loads via additional cooling lines.

Although examples are illustrated and described herein, embodiments are nevertheless not limited to the details shown, since various modifications and structural changes may be made therein by those of ordinary skill within the scope and range of equivalents of the claims.

What is claimed is:

1. A thermal system comprising:
    a reservoir;
    a first fluid flowpath from the reservoir and returning to the reservoir comprising in a direction of fluid flow:
        a first side of a sub-cooler;
        a liquid pump;
        a first side of a pre-heater; and
        a first side of an evaporator
    and
    a second fluid flowpath from the reservoir and returning to the reservoir comprising in a direction of fluid flow:
        a pressure regulator;
        a vapor compressor;
        a first side of a condenser; and
        an expansion valve.

2. The thermal system of claim 1, wherein said first fluid flowpath further comprises a pressure regulator after said first side of said evaporator.

3. The thermal system of claim 1 further comprising a sub-cooling fluid flowpath from the reservoir to a suction of the vapor compressor comprising in a direction of fluid flow:
    a flow controller; and
    a second side of the sub-cooler.

4. The thermal system of claim 3 further comprising a pre-heating fluid flowpath from a discharge of the vapor compressor to the reservoir comprising in a direction of fluid flow:
    a flow controller; and
    a second side of the pre-heater.

5. The thermal system of claim 3 further comprising a pre-heating fluid flowpath from the discharge of the vapor compressor to the reservoir comprising in a direction of fluid flow:
    a second side of the pre-heater; and
    a flow controller.

6. The thermal system of claim 1 further comprising a pre-heating fluid flowpath from a discharge of the vapor compressor to the reservoir comprising in a direction of fluid flow:
    a flow controller; and
    a second side of the pre-heater.

7. The thermal system of claim 1 further comprising a pre-heating fluid flowpath from a discharge of the vapor compressor to the reservoir comprising in a direction of fluid flow:
    a second side of the pre-heater; and
    a flow controller.

8. The thermal system of claim 1 comprising a fluid in said first and second fluid flowpaths, wherein said fluid is a sub-cooled liquid at a suction of the liquid pump by a first margin of sub-cooling and the fluid is a sub-cooled liquid at an inlet to the evaporator by a second margin of sub-cooling.

9. The thermal system of claim 8 wherein the fluid at an outlet of the evaporator has a vapor quality no more than 90%.

10. The thermal system of claim 9 wherein a temperature of the fluid at an inlet of an evaporator channel is the same as a temperature of the fluid at an outlet of the evaporator channel.

11. The thermal system of claim 8 wherein a temperature of the fluid at an inlet of an evaporator channel is the same as a temperature of the fluid at an outlet of the evaporator channel.

12. The thermal system of claim 1 further comprising a cooling fluid flowpath from the reservoir to a suction of the vapor compressor comprising in a direction of fluid flow:
    a control valve; and
    a heat exchanger.

13. The thermal system of claim 1 wherein a fluid at an outlet of the evaporator has a vapor quality no more than 90%.

14. A thermal system for maintaining the temperature of a primary heat load, said thermal system comprising:
  a reservoir;
  a cooling loop originating from the reservoir and returning to the reservoir, the cooling loop comprising:
    a primary heat exchanger having a cooling fluid outlet in fluid communication with the reservoir;
    a liquid pump having a suction in fluid communication with the reservoir and a discharge in fluid communication with a cooling fluid inlet to the primary heat exchanger;
    a sub-cooler between the reservoir and the suction of the pump;
    a pre-heater between the discharge of the pump and the cooling fluid inlet to the primary heat exchanger; and
    a pressure regulator between the primary heat exchanger and the reservoir; and
  a heat rejection loop originating from the reservoir and returning the reservoir, the heat rejection loop comprising;
    a condenser having a hot fluid outlet in fluid communication with the reservoir;
    a vapor compressor having a suction in fluid communication with the reservoir and a discharge in fluid communication with a hot fluid inlet of the condenser;
    a pressure regulator between the reservoir and the suction of the vapor compressor; and
    an expansion valve between a fluid outlet of the condenser and the reservoir.

15. The thermal system of claim 14 wherein a heat sink for the sub-cooler comprises fluid drawn from the reservoir.

16. The thermal system of claim 15 wherein a heat source for the pre-heater comprises fluid drawn from the discharge of the vapor compressor.

17. The thermal system of claim 14 further comprising a secondary cooling flowpath originating from the reservoir and discharging into the suction of the vapor compressor, the secondary cooling flowpath comprising a flow control valve and the cold side of a secondary heat exchanger.

18. A method of maintaining the temperature of a primary heat load comprising:
  drawing a fluid from a reservoir;
  sub-cooling the fluid drawn from the reservoir;
  pumping the sub-cooled fluid to an inlet of an evaporator;
  pre-heating the pumped fluid prior to the inlet of the evaporator to a predetermined margin of sub-cooling;
  evaporating a portion of the fluid in the evaporator;
  regulating the pressure of the fluid at the outlet of the evaporator to thereby maintain a substantially constant fluid temperature between the inlet and the outlet of the evaporator; and
  returning the partially evaporated fluid to the reservoir;
  while simultaneously:
    drawing fluid from the reservoir;
    regulating the pressure of the fluid drawn from the reservoir;
    compressing the fluid drawn from the reservoir;
    condensing the compressed fluid;
    expanding the condensed fluid; and
    returning the expanded fluid to the reservoir.

19. The method of claim 18 comprising sub-cooling the fluid drawn from the reservoir by transferring heat from the fluid to expanded fluid drawn from the reservoir.

20. The method of claim 19 comprising pre-heating the fluid prior to the inlet of the evaporator by transferring heat from fluid drawn from compressed fluid.

21. The method of claim 18 comprising pre-heating the fluid prior to the inlet of the evaporator by transferring heat from fluid drawn from compressed fluid.

* * * * *